US010415540B2

(12) United States Patent
Alloin et al.

(10) Patent No.: US 10,415,540 B2
(45) Date of Patent: Sep. 17, 2019

(54) METHOD FOR STABILIZING THE ROTATION SPEED OF A HYDRAULIC MACHINE WITH S-CHARACTERISTICS AND INSTALLATION FOR CONVERTING HYDRAULIC ENERGY INTO ELECTRICAL ENERGY

(71) Applicant: Alstom Renewable Technologies, Grenoble (FR)

(72) Inventors: Quentin Alloin, Grenoble (FR); Nicolas Perrissin-Fabert, Grenoble (FR); Renaud Guillaume, Grenoble (FR)

(*) Notice: Subject to any disclaimer, the term of this patent is extended or adjusted under 35 U.S.C. 154(b) by 0 days.

(21) Appl. No.: 15/532,108

(22) PCT Filed: Dec. 1, 2015

(86) PCT No.: PCT/EP2015/078240
§ 371 (c)(1),
(2) Date: Jun. 1, 2017

(87) PCT Pub. No.: WO2016/087458
PCT Pub. Date: Jun. 9, 2016

(65) Prior Publication Data
US 2017/0268478 A1     Sep. 21, 2017

(30) Foreign Application Priority Data

Dec. 4, 2014   (EP) ..................................... 14290369

(51) Int. Cl.
*G06F 19/00*     (2018.01)
*F03B 15/10*     (2006.01)
(Continued)

(52) U.S. Cl.
CPC ................ *F03B 15/10* (2013.01); *F03B 3/02* (2013.01); *F03B 3/06* (2013.01); *F03B 3/103* (2013.01);
(Continued)

(58) Field of Classification Search
CPC combination set(s) only.
See application file for complete search history.

(56) References Cited

U.S. PATENT DOCUMENTS 3,464,432 A * 9/1969 Schleif .................... F03B 15/10
                                                           137/48
4,743,827 A * 5/1988 Shiozaki ............... H02J 15/003
                                                           318/798
(Continued)

FOREIGN PATENT DOCUMENTS

CN         1521405 A       8/2004
DE      198 60 617 C1     10/2000

OTHER PUBLICATIONS

Extended European Search Report and Opinion issued in connection with corresponding EP Application No. 14290369.9 dated May 27, 2015.
(Continued)

*Primary Examiner* — Kidest Bahta
(74) *Attorney, Agent, or Firm* — GE Global Patent Operation; Douglas D. Zhang

(57) ABSTRACT

The method allows stabilizing the rotation speed of a hydraulic machine with S-characteristics. It is implemented by means of a control loop feedback system having a controller for calculating an orientation to affect guide vanes of the machine. It includes steps of calculating a set of internal states associated with the operating point of the machine, establishing a linearized transfer function in function of the set of internal states, calculating characteristics parameters of the controller in function of the established transfer function so that the control loop feedback system is stable, measuring the rotation speed of the hydraulic machine, comparing the measured rotation speed with a target rotation speed, and adjusting the orientation affected
(Continued)

to the guide vanes so as to reduce the speed difference between the calculated rotation speed and the target rotation speed.

11 Claims, 3 Drawing Sheets

(51) Int. Cl.
  *F03B 3/02* (2006.01)
  *F03B 3/10* (2006.01)
  *F03B 15/00* (2006.01)
  *F03B 15/08* (2006.01)
  *F03B 3/06* (2006.01)

(52) U.S. Cl.
  CPC ............ *F03B 15/005* (2013.01); *F03B 15/08* (2013.01); *F05B 2270/101* (2013.01); *F05B 2270/1014* (2013.01); *F05B 2270/706* (2013.01); *Y02E 10/223* (2013.01); *Y02E 10/226* (2013.01)

(56) References Cited

U.S. PATENT DOCUMENTS

| | | | |
|---|---|---|---|
| 5,160,244 A * | 11/1992 | Kuwabara | F04D 15/00 |
| | | | 290/52 |
| 5,355,675 A * | 10/1994 | Mayhugh | B66D 1/44 |
| | | | 60/327 |
| 6,322,323 B1 * | 11/2001 | Komiyama | F01D 5/286 |
| | | | 415/200 |
| 6,898,540 B2 | 5/2005 | Davies | |
| 7,072,744 B2 | 7/2006 | Kuwabara | |
| 7,092,795 B2 | 8/2006 | Kuwabara | |
| 2002/0146314 A1 | 10/2002 | Kuwabara | |
| 2005/0267644 A1 * | 12/2005 | Kuwabara | F03B 15/005 |
| | | | 700/287 |
| 2007/0140829 A1 * | 6/2007 | Maillard De La Morandais | ........ F03B 3/06 |
| | | | 415/4.1 |
| 2009/0021011 A1 * | 1/2009 | Shifrin | F03B 3/06 |
| | | | 290/43 |
| 2010/0031670 A1 * | 2/2010 | Hoffman | F01D 15/10 |
| | | | 60/793 |

OTHER PUBLICATIONS

International Search Report and Written Opinion issued in connection with corresponding PCT Application No. PCT/EP2015/078240 dated Feb. 16, 2016.

International Preliminary Report on Patentability issued in connection with corresponding PCT Application No. PCT/EP2015/078240 dated Jun. 6, 2017.

* cited by examiner

METHOD FOR STABILIZING THE ROTATION SPEED OF A HYDRAULIC MACHINE WITH S-CHARACTERISTICS AND INSTALLATION FOR CONVERTING HYDRAULIC ENERGY INTO ELECTRICAL ENERGY

BACKGROUND OF THE INVENTION

The invention relates to a method for stabilizing the rotation speed of a hydraulic machine with S-characteristics. Typical hydraulic machines with S-characteristics are pump-turbine functioning in turbine mode or Francis turbine designed for high net head conditions. The invention also concerns an installation for converting hydraulic energy into electrical energy, on which this method can be implemented.

During a pump-turbine start-up in turbine mode, the rotation speed of its runner must be stabilized and synchronized with the grid frequency, so that the machine can be coupled to the grid. Besides, the coupling operation is usually performed when the pump-turbine is at a no-load operating point, at which the water flow does not exert any torque on the runner. This particular operating point is the coupling point.

Under low water fall conditions, rotational speed stabilization may be hard to reach because of the presence of "S-zones". "S-zones" are unstable zones wherein the machine is sensitive to perturbations. As a result, a slight rotational speed variation relative to the coupling point leads to a significant increase of the torque applied by the water flow on the runner, hence substantially increasing or decreasing the rotation speed of the machine. Under these conditions, it is not possible to stabilize the machine rotational speed with a conventional PID loop.

To solve this problem, it is known to completely redesign hydraulic parts of the machine, such as the runner or the guide vanes. In particular, hydraulic parts of the machine are redesigned to avoid the presence of S-zones in the operating range of the pump-turbine in turbine mode. The operating range of a machine corresponds to the interval between the lower gross head and the upper gross head to which may be subjected the machine. However, this solution is very expensive to implement and reduces the performance of the pump-turbine.

Another solution consists in equipping the pump-turbine with non-synchronized guide vanes. This means that some guide vanes can be oriented independently. As a result, at machine start-up, some of the guide vanes are opened further than others, which temporarily modifies the machine characteristics. This allows avoiding the presence of S-zones during start-up. Nevertheless, this solution generates unwilled vibrations which impact the life-time of the machine.

Finally a method for stabilizing the rotation speed of a turbine apparatus at a point that is very close to the S-characteristic portion, without risking entering in this unstable portion. The S-characteristic portion can be defined as the curve portion with a positive slope on FIG. 1A of the application, that is the portion below the NR curve. The NR curve is the curve at which no torque is exerted by water flow on the turbine runner. The method consists in using a PID controller acting directly on the rotation speed of the machine. This PID controller is specific in that its characteristic parameters may be changed depending on the rotation speed of the machine. More precisely, when the machine rotation speed increases from 0 to a predetermined speed, a high gain is affected the coefficients of the proportional and integrative elements of the PID controller. However, when the rotation speed exceeds the predetermined speed, a low gain is affected to the coefficients of the proportional and integrative elements of the PID controller.

In the described example, the predetermined speed is set to 80% of the target rotation speed. As a result, when the machine operating point gets close to the coupling point, the speed of convergence toward the coupling point is slowed down to avoid exciting the system and entering into the unstable S-characteristic portion. The characteristic parameters of the PID controller are selected between two values using a pair of switches.

The major drawback of this method is that it does not allow stabilizing the rotation speed of the machine when the coupling point is precisely located into the S-characteristic portion.

BRIEF DESCRIPTION OF THE INVENTION

Embodiments of the invention solve this drawback by a method for stabilizing the rotation speed of a hydraulic machine that allows stabilizing the rotation speed in S-characteristic portion.

To this end, embodiments of a method for stabilizing the rotation speed of a hydraulic machine with S-characteristics are disclosed.

In an embodiment, the characteristic parameters of the controller are changed at each iteration for ensuring the control loop feed-back system stability. This control loop feed-back system is then not sensitive to the fact that the coupling point is or is not in a S-characteristic portion. Consequently, the machine may be synchronized to the grid even when the coupling point is located in the S-characteristic portion.

A method for stabilizing the rotation speed of a hydraulic machine with S-characteristics. It is implemented by a control loop feedback system having a controller for calculating an orientation to affect guide vanes of the machine. An embodiment of the method comprises: calculating a set of internal states associated with the operating point of the machine, in accordance with the set of internal states calculated, establishing a linearized transfer function representing the machine rotational speed in function of the guide vanes orientation, calculating characteristic parameters of the controller in function of characteristic parameters of the linearized transfer function established, so that the control loop feedback system is stable, measuring the rotation speed of the hydraulic machine, comparing the measured rotation speed with a target rotation speed, and adjusting, by the controller, the orientation affected to the guide vanes so as to reduce the speed difference between the measured rotation speed and the target rotation speed.

An embodiment provides an installation for converting hydraulic energy into electrical energy, comprising a hydraulic machine with adjustable guide vanes, further comprising: a control loop feedback system having a controller for calculating an orientation to affect the guide vanes, a calculator to calculate a set of internal states associated with the operating point of the machine, a calculator to establish, in accordance with the set of calculated internal states, a linearized transfer function representing the machine rotational speed in function of the guide vanes orientation, a calculator to calculate characteristic parameters of the controller in function of characteristic parameters of the established linearized transfer function so that the control loop feedback system is stable, measuring tool to measure the rotation speed of the hydraulic machine, comparison tool to compare the measured rotation speed with a target rotation speed, and a controller to adjust the orientation affected to the guide vanes so as to reduce the speed difference between the measured rotation speed and the target rotation speed.

BRIEF DESCRIPTION OF THE DRAWINGS

Embodiments of the invention will now be explained in correspondence with the figures, and as an illustrative example, without restricting the object of the invention. In the figures.

DETAILED DESCRIPTION

Figure 1:
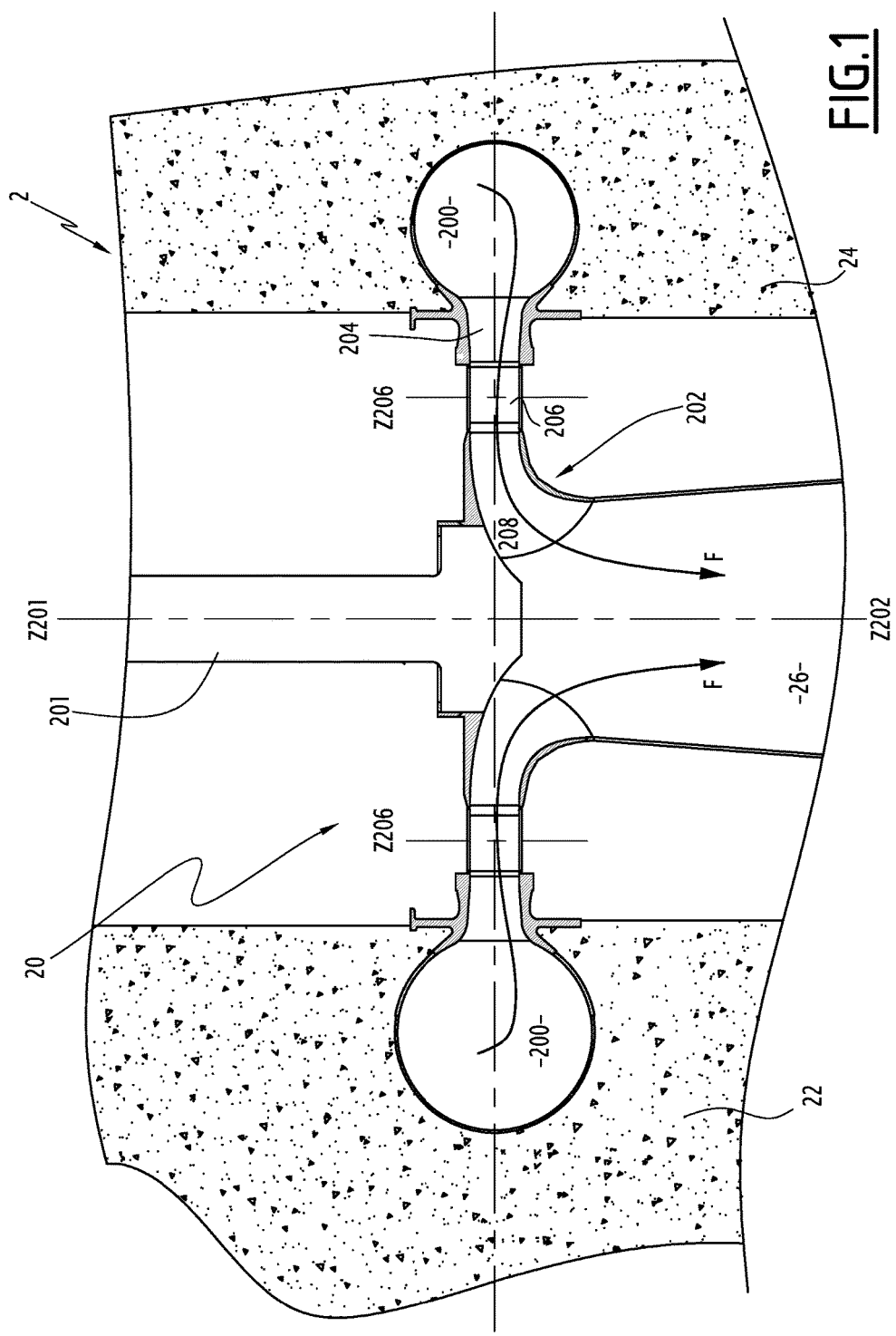
FIG. 1 is a schematic section of an installation for converting hydraulic energy into electrical energy, and reciprocally comprising a pump-turbine.

FIG. 1 represents an installation 2 for converting hydraulic energy into electrical energy. The installation 2 includes a hydraulic machine. In the example, this hydraulic machine is a pump-turbine 20 that uses, in turbine mode, hydraulic energy to set a shaft 201 in rotation around an axis Z201. The shaft 201 is coupled to a non-represented generator to produce electricity.

Here-below, unless otherwise mentioned, the pump-turbine 20 is functioning in turbine mode. The pump-turbine 20 includes a volute 200 that is supported by concrete blocks 22 and 24. A non-represented penstock extends between a non-represented upstream reservoir and the volute 200. This penstock generates a forced water flow F to power the machine 20. The machine 20 includes a runner 202 that is surrounded by the volute 200 and that includes blades 208 between which water flows in operating conditions. As a result, the runner 202 rotates around an axis Z202 that is superimposed with the axis of rotation Z201 of the shaft 201. The runner 202 is secured to the shaft 201.

A distributor is arranged around the runner 202. It includes a plurality of movable guide vanes 206 that are evenly distributed around the runner 202. A pre-distributor is disposed upstream of and around the distributor. The pre-distributor is formed by a plurality of stay vanes 204 evenly distributed around the axis of rotation Z202 of the runner 202.

A suction pipe 26 is disposed below the runner 202 and is adapted to evacuate water downstream the machine 20.

The guide vanes 206 of the distributor have each an adjustable pitch around an axis Z206 parallel to the axis of rotation Z202 of the runner 202. Consequently, they may be swiveled to regulate the flow rate of water entering the machine 20. The guide vanes 206 are all oriented with the same angle relative to a closed position. In other words, they are synchronized.

The hillchart of a hydraulic machine is a collection of operating points that are each defined by a quadruplet of values N11, C11, Q11, Y, wherein Y is the orientation affected to the guide vanes 206, N11 is a parameter that depends on the rotation speed of the machine, C11 is a parameter that depends on the torque exerted by water of flow F on the machine runner and Q11 is a parameter that depends on the flow rate of water flowing through the hydraulic machine. At a given guide vanes orientation Y, an "iso-opening" curve can be extracted from the hillchart.

Figure 2:
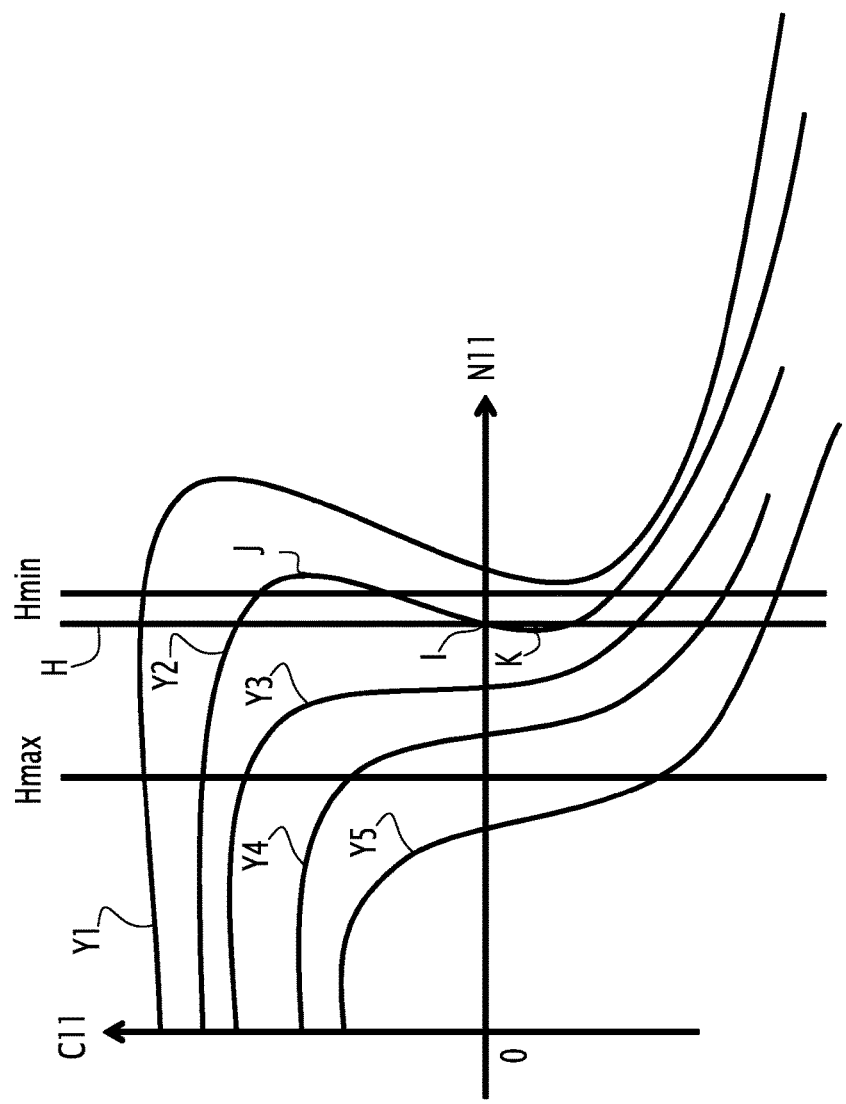
FIG. 2 is a graph representing characteristics in turbine mode of the pump-turbine of the installation of FIG. 1.

As an illustrative example, FIG. 2 represents five iso-opening curves that correspond each to a different guide vanes orientation Y1, Y2, Y3, Y4 and Y5. These iso-opening curves are plotted on a graph having N11-axis as abscissa axis and C11-axis as ordinate axis. The upper right quadrant of that graph, that is the quadrant wherein N11 and C11 are both positive, corresponds to turbine mode. In turbine mode, the operating range of the pump-turbine 20 corresponds to the interval between a lower gross head Hmin and an upper gross head Hmax to which may be subjected the machine. At a given net head H, the coupling point I of the machine 20 is known. This coupling point I corresponds to a point at which the pump-turbine 20 may be coupled to the grid in turbine mode. It is a no-load operating point, at which no torque is exerted on the runner 202 and at which the machine rotation speed is synchronized with the grid frequency. In the chosen example, this coupling point I is located on the iso-opening curve associated to the guide vanes opening Y2. As shown on FIG. 2, the hydraulic machine 20 presents S-characteristics under low water fall conditions. More precisely, the iso-opening curves corresponding to the guide vanes opening Y1 and Y2, which allow reaching the machine coupling point under low water fall conditions, include an S-portion.

In the present document, an S-characteristic portion of an iso-opening curve corresponds to a curve portion having a positive slope. In other words, it is a curve portion for which an increase of the parameter N11 implies an increase of the parameter C11. For the clarity of the specification, considering the example of the iso-opening curve associated to the guide vanes opening Y2, the S-characteristic portion is delimited between points K and J.

The S-characteristic portion is deemed unstable. This means that the hydraulic machine 20 is sensitive to perturbations in this particular portion. As a result, a slight variation of the rotation speed of the machine relative to the coupling point I implies a significant increase of the torque applied while the water flow F on the runner 202 of the pump-turbine 20, hence substantially increasing or decreasing the machine rotation speed. The stabilization of the machine rotation speed may then be hard to achieve.

Here-below, one explains, in correspondence with FIG. 3, a method for automatically stabilizing the rotation speed of a hydraulic machine with S-characteristics. In particular, the method is suited for stabilizing the machine rotation speed when the coupling point is located in a S-characteristic portion, such the point I.

Figure 3:
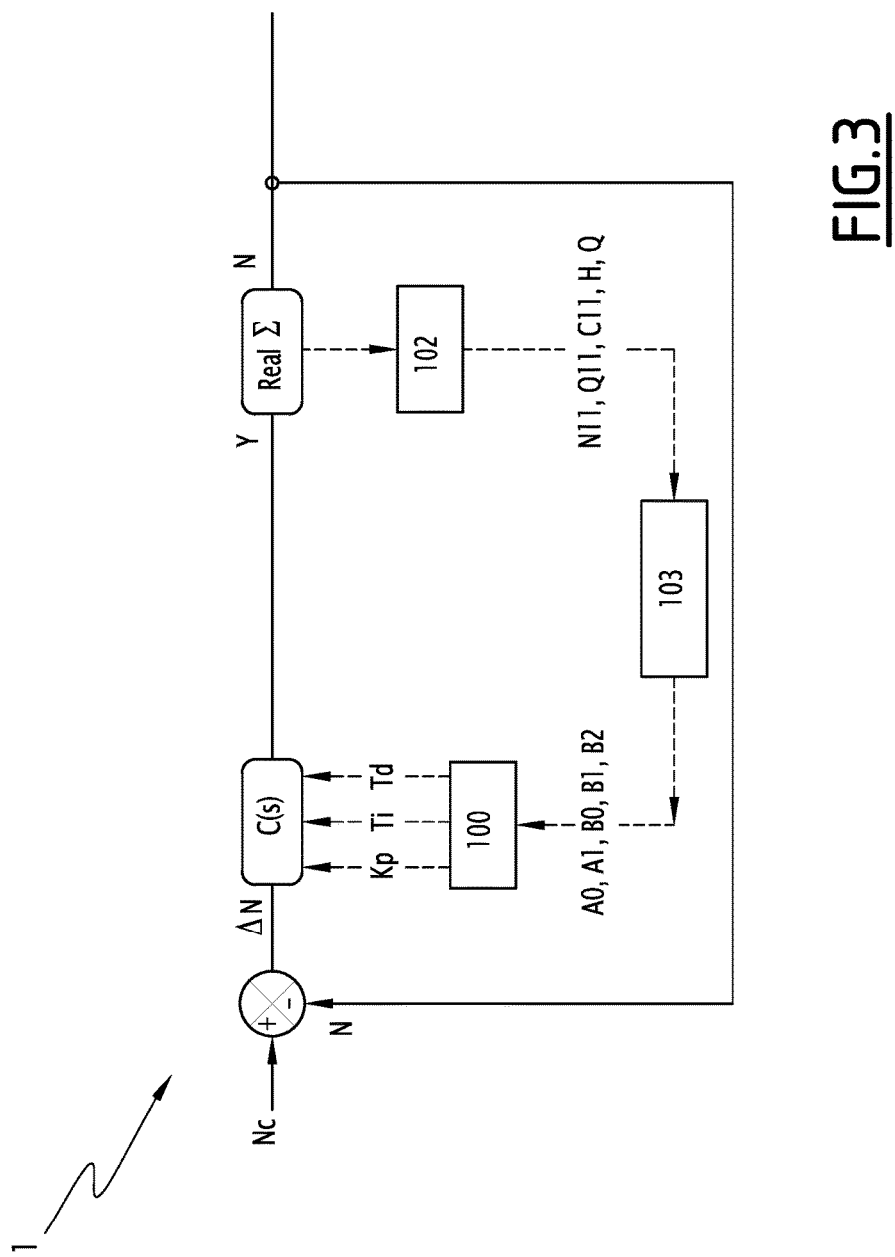
FIG. 3 is a control scheme illustrating a method that aims at stabilizing the rotation speed of the pump-turbine belonging to the installation of FIG. 1.

As shown on FIG. 3, this method is implemented by means of a control loop feed-back system 1 having a controller C(s) that is, in the example, a proportional integrative derivative controller. The controller C(s) takes as input a speed difference ΔN between the rotation speed N of the hydraulic machine and the target rotation speed Nc. Then, the controller C(s) outputs an orientation Yi to affect the guide vanes 206. In Laplace domain, the transfer function of the controller is given below:

$$C(s) = \frac{Kp^*(1 + Ti^*s + Ti^*Td^*s^2)}{Ti^*s} = \frac{Yi}{\Delta N} \qquad \text{Equation 2}$$

wherein Kp, Ti and Td are regulation parameters of the controller.

The control loop feedback system 1 acts directly on the real machine behavior, that is represented by bloc real Σ on FIG. 3. Real Σ corresponds to the real transfer function of the hydraulic machine 20.

The method is iterative. It consists then in successively generating regulation parameters of C(s) to stabilize the rotation speed at the target rotation speed. The target rotation speed Nc corresponds to a synchronization speed with the grid. At the beginning of the method, the guide vanes 206 are oriented at a nominal orientation.

A first step of the method consists in calculating a set of internal states associated to the operating point of the machine 20. This set of internal states includes the coordinates N11, Q11, C11 of the operating point, the net head H subjected to the hydraulic machine 20, the flow rate Q of water passing through the machine 20 and some partial derivatives associated to the coordinates of the machine operating point. These partial derivatives are intrinsic to the operating point quadruplet of values.

The set of internal states associated to the operating point may be calculated on the basis of hillchart knowledge and of direct measurements. A calculator 102 integrated to the control loop feedback system 1 allows performing this task.

The transfer function Σ real is highly non-linear and cannot be directly exploited to stabilize the machine rotational speed.

A second step of the method consists then in establishing a linearized transfer function Σlin(s) that may be used in the calculation process leading to the stabilization of the machine rotation speed N. It represents the machine rotational speed in function of the orientation affected to the guide vanes. This transfer function Σlin(s) can be considered as the closest linearized model to reality. In Laplace domain, the transfer function Σlin(s) can be given by the equation below:

$$\Sigma lin(s) = \frac{A0 + A1.s}{B0 + B1.s + B2.s^2} \quad \text{Equation 1}$$

wherein A0, A1, B0, B1 and B2 are characteristic parameters that depend on the machine operating point and s is the Laplace variable. In this example, we use a second order transfer function. For a more accurate model, a higher order may be used.

The characteristic parameters A0, A1, B0, B1 and B2 of the linearized transfer function Σlin(s) are calculated in function of the set of internal states calculated at the first step so that the transfer function Σlin(s) is as realistic as possible. This operation is done in a calculator 103. In other words, the linearized transfer function characteristic parameters are calculated so that the rotation speed calculated according to this linearized function is approximately the same than the real rotation speed at a given guide vanes orientation.

A third step of the method is to calculate the regulation parameters Kp, Ti and Td of the controller so that the control loop feedback system 1 is stable. For that purpose, a calculator 100 designed for performing this task is integrated to the control system 1 and the real transfer function real Σ is approximated by the linearized transfer function Σlin(s). The regulation parameters are calculated so that the approximated closed loop-transfer function $$F(s) = \frac{C(s).\Sigma\, lin(s)}{1 + C(s).\Sigma\, lin(s)}$$

of the control loop feedback system 1 has stable poles.

As a reminder, the poles of an expression are the values of the Laplace variable s for which the denominator of the expression is null.

It exists various numbers of methods to ensure stability of F(s). For example, the pole compensation method is presented here. Pole placement method can also be used but is not presented. The poles of the denominator of the transfer function Σlin(s) are deemed unstable. The numerator of the controller C(s) is then adjusted to compensate, or inhibit, this unstable behavior. More precisely, the numerator of the controller C(s) is chosen to have the same poles than the denominator of the transfer function Σlin(s). This is called pole compensation and results in the following equation:

$$Ti = \frac{B1}{B0} \text{ and } Td = \frac{B2}{B1} \quad \text{Equation 3}$$

Considering the two above equations, the closed loop-transfer function F(s) of the control loop feedback system 1 can be expressed as below:

$$F(s) = \frac{Kp^*(A0 + A1^*s)}{Kp^*(A0 + A1^*s) + B1^*s} \quad \text{Equation 4}$$

To ensure stability of the control loop feedback system 1, the poles of the denominator of the approximated control loop-transfer function F(s) must each have a negative real part. To achieve this goal, a pole placement method can be used. This pole placement method consists in adjusting the parameters of the expression to obtain one or more desired poles. In the present case, a pole equals to $$\frac{-1}{T_{BF}}$$

can be chosen, wherein $T_{BF}$ corresponds to a characteristic time period of the controller. As a result, the denominator of the approximated closed-loop transfer function F(s) can be expressed as below:

$$1 + T_{BF}{}^*s = 1 + \left(\frac{A1}{A0} + \frac{B1}{Kp^*A0}\right)^*s \quad \text{Equation 5}$$

wherein $$T_{BF} = \frac{Kp^*A1 + B1}{Kp^*A0} \quad \text{Equation 6}$$

The third characteristic parameter Kp of the controller can then be extracted on the basis of the above equation, as set out below:

$$Kp = \frac{B1}{T_{BF}*A0 - A1} \quad \text{Equation 7}$$

A fourth step of the method is to measure the rotation speed N of the machine.

A further step consists in comparing the measured rotation speed N with the target rotation speed Nc, that corresponds to the synchronization speed with the grid.

A last step consists in automatically adjusting, by the controller, the orientation affected to the guide vanes 206 so as to reduce the speed difference $\Delta N$ between the measured rotation speed N and the target rotation speed Nc. For that purpose, the controller outputs a target opening $Y_{i+1}$ to affect the guide vanes 206. This target opening $Y_{i+1}$ is used as a command for the guide vanes 206 of the real system represented by the linearized transfer function $\Sigma lin(s)$.

Indeed, as mentioned here-above, the method is iterative, which means that the steps described here-above are reiterated while the system is in start-up mode As a result, the characteristic parameters of the linearized transfer function $\Sigma lin(s)$ are calculated at each iteration of the method to fit as much as possible with reality. Accordingly, the regulation parameters Kp, Ti and Td of the controller are calculated at each increment, that is at each iteration of the method, so as to obtain a control loop feedback system that is stable.

In an embodiment, a similar method can be implemented to stabilize the rotation speed of a double-regulated turbine, such as a Kaplan turbine or a Bulb turbine. A double-regulated turbine includes a hub equipped with movable blades. The flow rate of water circulating around the hub is also regulated thanks to a series of guide vanes. In this case, the movable blades are also oriented to reduce the speed difference $\Delta N$ between the rotation speed N calculated on the basis of the transfer function $\Sigma lin(s)$ and the target rotation speed Nc.

In an embodiment, a similar method can be implemented to stabilize the rotational speed of a Francis turbine designed for high net head conditions.

In an embodiment, another type of controller than a PID controller may be used. For instance, the controller C(s) may be a lead-lag compensator or a double derivative controller. The technical features of the different embodiments and alternative embodiments of the invention described here-above can be combined together to generate new embodiments of the invention.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for stabilizing the rotation speed of a hydraulic machine with S-characteristics, implemented by a control loop feedback system having a controller for calculating an orientation to affect guide vanes of the machine, the method comprising:
   a) calculating a set of internal states associated with the operating point of the machine,
   b) in accordance with the set of internal states calculated at step a), establishing a linearized transfer function representing the machine rotational speed in function of the guide vanes orientation,
   c) calculating characteristic parameters of the controller in function of characteristic parameters of the linearized transfer function established at step b) so that the control loop feedback system is stable,
   d) measuring the rotation speed of the hydraulic machine,
   e) comparing the measured rotation speed with a target rotation speed, and
   f) adjusting, by the controller, the orientation affected to the guide vanes so as to reduce the speed difference between the measured rotation speed and the target rotation speed.

2. The method according to claim 1, wherein the set of internal states associated with the operating point comprises the coordinates of the operating point, the net head subjected to the hydraulic machine, the flow rate of water passing through the machine and some partial derivative associated with the coordinates of the machine operating point.

3. The method according to claim 1, wherein the characteristic parameters of the controller are calculated according to a pole compensation method and/or a pole placement method.

4. The method according to claim 1, wherein the controller is a proportional integrative derivative controller.

5. The method according to claim 1, wherein the hydraulic machine is a double-regulated turbine, comprising a hub equipped with movable blades and step d) further comprises adjusting the orientation affected to the movable blades of the machine to reduce the speed difference between the measured rotation speed of the machine and the target rotation speed.

6. The method according to claim 1, wherein the linearized transfer function and the controller are modelled in Laplace domain.

7. A installation for converting hydraulic energy into electrical energy, comprising a hydraulic machine with adjustable guide vanes, further comprising:
   a control loop feedback system having a controller for calculating an orientation to affect the guide vanes,
   a first calculator to calculate a set of internal states associated with the operating point of the machine,
   a second calculator to establish, in accordance with the set of calculated internal states, a linearized transfer function representing the machine rotational speed in function of the guide vanes orientation,
   a third calculator to calculate characteristic parameters of the controller in function of characteristic parameters of the established linearized transfer function so that the control loop feedback system is stable,
   a measuring tool to measure the rotation speed of the hydraulic machine,
   a comparison tool to compare the measured rotation speed with a target rotation speed, and
   a controller to adjust the orientation affected to the guide vanes so as to reduce the speed difference between the measured rotation speed and the target rotation speed.

8. The installation according to claim 7, wherein the hydraulic machine is a pump-turbine with S-characteristics in turbine mode.

9. The installation according to claim 7, wherein the hydraulic machine is a Francis turbine designed for high net head conditions.

10. The installation according to claim 7, wherein the hydraulic machine is a double-regulated turbine, comprising a hub equipped with movable blades and wherein the controller adjusts the orientation affected to the movable blades of the machine so as to reduce the speed difference between the measured rotation speed of the machine and the target rotation speed.

11. The method according to claim 1, wherein the hydraulic machine has a S-characteristic portion, and the method is used for stabilizing the rotation speed of the hydraulic machine in the S-characteristics portion.

* * * * *